(12) United States Patent
Ferguson

(10) Patent No.: US 7,363,497 B1
(45) Date of Patent: Apr. 22, 2008

(54) SYSTEM FOR DISTRIBUTION OF RECORDED CONTENT

(75) Inventor: Alexander Ferguson, Bethesda, MD (US)

(73) Assignee: Immediatek, Inc., Dallas, TX (US)

(*) Notice: Subject to any disclaimer, the term of this patent is extended or adjusted under 35 U.S.C. 154(b) by 510 days.

(21) Appl. No.: 09/620,572

(22) Filed: Jul. 20, 2000

Related U.S. Application Data

(60) Provisional application No. 60/144,867, filed on Jul. 20, 1999.

(51) Int. Cl.
H04L 9/00 (2006.01)

(52) U.S. Cl. .................................... 713/176

(58) Field of Classification Search ............... 713/176, 713/201; 705/75; 382/232; 380/236, 237
See application file for complete search history.

(56) References Cited

U.S. PATENT DOCUMENTS

| | | | |
|---|---|---|---|
| 5,418,713 A | 5/1995 | Allen | 364/403 |
| 5,440,336 A | 8/1995 | Buhro et al. | 348/13 |
| 5,592,511 A | 1/1997 | Schoen et al. | 375/220 |
| 5,633,839 A | 5/1997 | Alexander et al. | 369/30 |
| 5,636,276 A | 6/1997 | Brugger | 380/4 |
| 5,664,018 A * | 9/1997 | Leighton | 380/54 |
| 5,734,119 A | 3/1998 | France et al. | 84/622 |
| 5,740,134 A | 4/1998 | Peterson | 369/30 |
| 5,748,763 A | 5/1998 | Rhoads | 382/115 |
| 5,793,980 A * | 8/1998 | Glaser et al. | 709/231 |
| 5,818,510 A | 10/1998 | Cobbley et al. | 348/7 |
| 5,826,024 A | 10/1998 | Higashimura et al. | 395/200.44 |
| 6,052,470 A * | 4/2000 | Mouri | 381/18 |
| 6,205,249 B1 * | 3/2001 | Moskowitz | 382/232 |
| 6,272,634 B1 * | 8/2001 | Tewfik et al. | 713/176 |
| 6,338,044 B1 * | 1/2002 | Cook et al. | 705/14 |
| 6,442,283 B1 * | 8/2002 | Tewfik et al. | 382/100 |
| 6,959,220 B1 * | 10/2005 | Wiser et al. | 700/94 |

OTHER PUBLICATIONS

Gabrielle Bouvigne, MP3 Glossary, 1998.*

* cited by examiner

Primary Examiner—Kambiz Zand
Assistant Examiner—Andrew L Nalven
(74) Attorney, Agent, or Firm—Daniel J. Chalker; Chalker Flores, LLP

(57) ABSTRACT

A method and system to acquire, digitize, store, and deliver live content, such as music, to an end user via a network. The system can capture live content directly into a portable audio format which can be encoded at various levels of resolution into a file. The encoded file can then be transported over a network to a network distributor who can then sell the encoded file to end users. The system can also insert a digital watermark into each user file which can contain the user information, the copyright information, and a unique serial number for future verification and copy protection. The digital watermark can survive file or format conversion.

34 Claims, 5 Drawing Sheets

SYSTEM FOR DISTRIBUTION OF RECORDED CONTENT

This application claims the benefit of Provisional Application 60/144,867, filed Jul. 20, 1999, which is incorporated herein by reference.

FIELD OF THE INVENTION

The present invention relates to the field of multimedia information distribution, and more particularly to a system and method of acquiring, digitizing, storing, and delivering live content via a network.

BACKGROUND OF THE INVENTION

The capturing of live performances into a digital format for rebroadcast poses many problems including the size and cost of the recording and broadcasting equipment, the transporting or distribution equipment, and the issues associated with the enormous amount of binary data required for recording in digital format.

Typically, the capturing or recording of a live performance requires expensive and elaborate broadcasting and distribution equipment. Past systems have employed transmission via satellite communication which typically includes extensive communications and broadcasting equipment and requires highly trained personnel to run the system. The present system can be employed with relatively small and lightweight equipment such as a laptop computer for linking to the network and the digital capture machine.

The present invention overcomes the problems associated with capturing live performances by providing a system which can capture analog signals from live performances and convert them into a digital format and store them in a portable file which can be transported via a network.

It is therefore an object of the invention to provide a system for capturing and distributing live content over a network which converts multiple analog signals into digital signals and stores the digital signals into a portable file for transporting over a network for use by an end user.

It is a further object of the invention to provide a device for capturing live content which converts analog signals into digital signals and stores the digital signals into a portable file.

It is a further object of the invention to provide a system which can employ a digital watermark and useable information into the digital signals and portable file.

SUMMARY OF THE INVENTION

In a preferred embodiment, the method and apparatus of the invention provides a means to acquire, digitize, store, sell and deliver live content, such as music, to consumers via a network. The invention further provides a novel means for digital watermarking of recorded content which is applicable not only to the live content distribution system of the invention but also to other forms of distribution of recorded content that is in digital form.

The process of the invention according to a preferred embodiment begins with the creation of an open shell, which includes, e.g., an artist's concert date and venue information, the shell being for use at a later date to hold live music content on a web site. Live content is captured at a concert location directly into a portable audio format which is encoded at 96 khz/24 bit or 128 khz/32 bit levels of audio resolution in a format with 128/32, or 160/40 over sampled format. A digital watermark containing the copyright holder's information along with the date and time of the performance of the concert is incorporated into the file using the additional over sampling rate indicated. The additional areas provide for both a data block, as well as a digital signature block to be encoded directly into the file itself. This digital watermarking process is broadly applicable to a variety of digital audio file formats and can survive format conversion. The file is transmitted to a live music service provider where it is placed in archives and is available for conversion download on a website. The web site preferably provides the user with the ability to select the type of media in which he would like to receive the file, the media types including, e.g., MP3, Real Audio, and shipped audio CD. Prior to delivery of the audio to the user, user information is encoded into the digital watermark in addition to the copyright holder's information, with a unique serial number that can be stored by the live music service provider for future verification and copy protection.

BRIEF DESCRIPTION OF THE DRAWINGS

The foregoing and other objects, features, and advantages of the invention will be apparent from the following more particular description of preferred embodiments as illustrated in the accompanying drawings.

DETAILED DESCRIPTION OF THE PREFERRED EMBODIMENT

Figure 1:
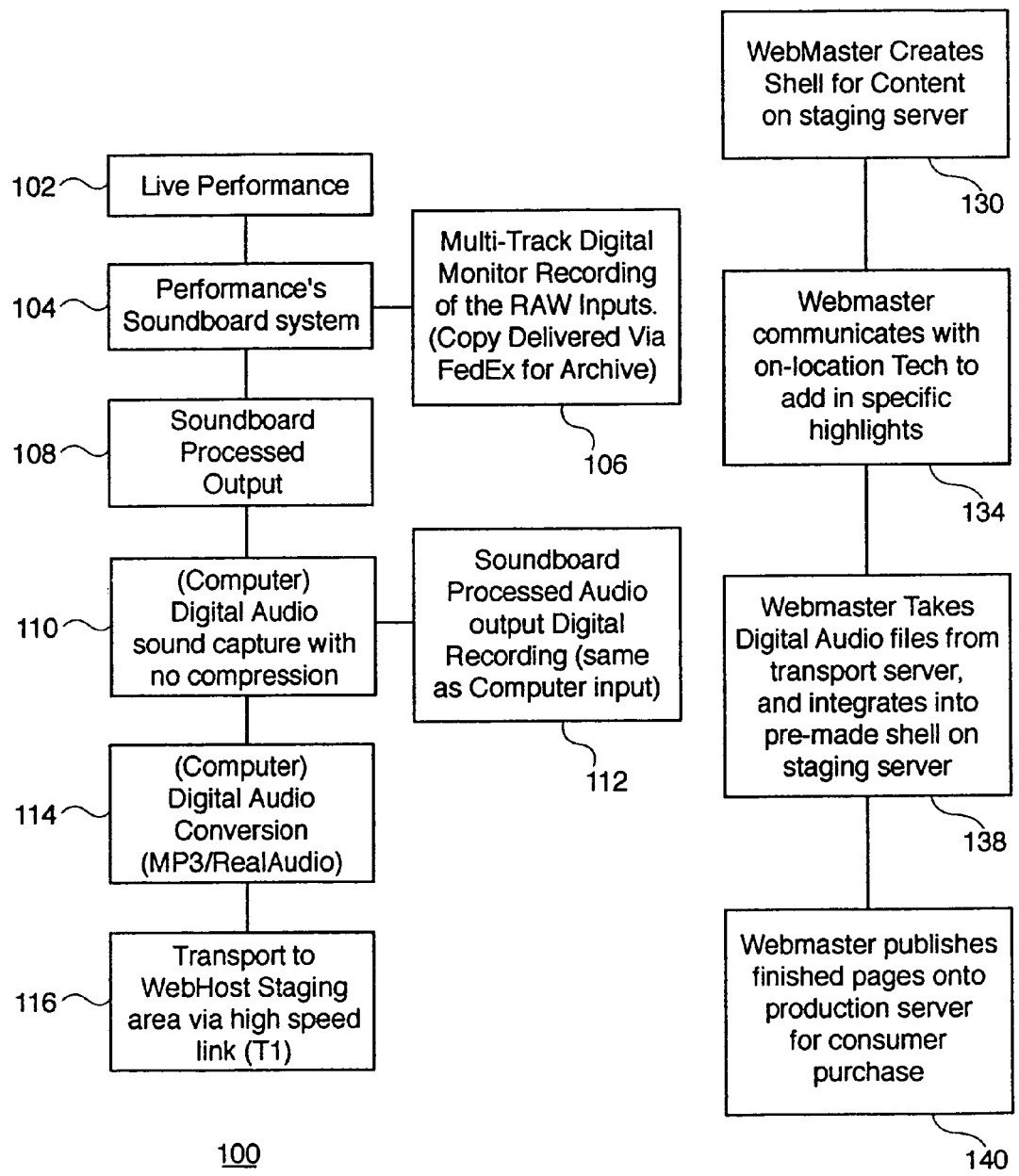
FIG. 1 shows a flow diagram illustrating the process of the invention according to a preferred embodiment.

The system of the invention for acquiring, digitizing, storing, selling and delivering live content will first be described in detail with reference to FIG. 1, which illustrates how information flows from a live performance 102 into the digital delivery system of the invention. In the example below, the system 100 is used to deliver digitized live music to consumers; however, it will be understood by those skilled in the art that the system 100 of the invention is also useful for the delivery of other forms of digitized content.

Once appropriate authorizations and contractual obligations with an artist or act have been defined and obtained, historical and future information regarding their performance dates and venues is obtained from the artist or act, or from the relevant production companies.

The date and venue information is used by a web master at a live music service provider to produce an open shell 130 of the performing artist for their future dates. The shell 130 that is created is specific to each venue for it's individual content, but would contain such standard information as: Tour Name, Dates, Performers, Promotional Clips, and Other Media Clips, such as Promotional Video, and Visuals (print-style) information. This can be created using HTML with enhancements such as "Flash Animation", or preferably XML, which would allow the web master to more tightly encode the information. There are a number of packages that can create this content, including encoding studio suites such as Macromedia's system, NetObject's system, or even basic text editors such as "vi". As can be seen from FIG. 1, parallel paths are preferably taken by the data while an open shell 130 is being pre-created at the web site to hold the data file upon completion, and then delivery to the user.

The web master puts into the open shell 130, for example, all of the information for a band's world tour and makes that information available on the website and also creates in the background shells for the distribution of the band's content at a future date so that the information is already prepared and waiting for the performances themselves to begin, allowing for a very rapid generation time from performance until the material is available for downloading.

A recording and digital conversion system 100 is used to capture a live performance 102 on site. The live performance 102 which may consists of various microphones, instrument inputs, and various other inputs are typically routed to a Soundboard system 104. A Mulit-track digital recording 106 is made of the live performance. In addition, the soundboard system 104 has a processed output 108. The processed output 108 routes the signals to a Digital Audio sound capture system 110 where a digital recording 112 is made. The Digital Audio Sound Capture System 110 feeds the signals to a Digital Audio conversion system 114 which converts the recordings into a useable file such as an MP3 or Real Audio file. The converted file will then be transported to a WebHost Staging area in step 116 via a high speed link, preferably at the highest possible digital levels. When the performance begins, the audio engineer will have already entered the appropriate copyright information and ownership information into the digital recording system so that it is encoded into every file that is created, creating in effect a digital watermark.

Separate from the live performance 102 and conversion process a webmaster creates an open shell 130 and communicates 134 with the live-performance recording and conversion system or a technician at the live performance to add specific highlights. The WebMaster then takes the Digital Audio files transported in step 116 from a transport server and integrates the files into the shell open in step 130. The Webmaster then publishes the finished pages onto the production server for consumer purchase in step 140.

Figure 2:
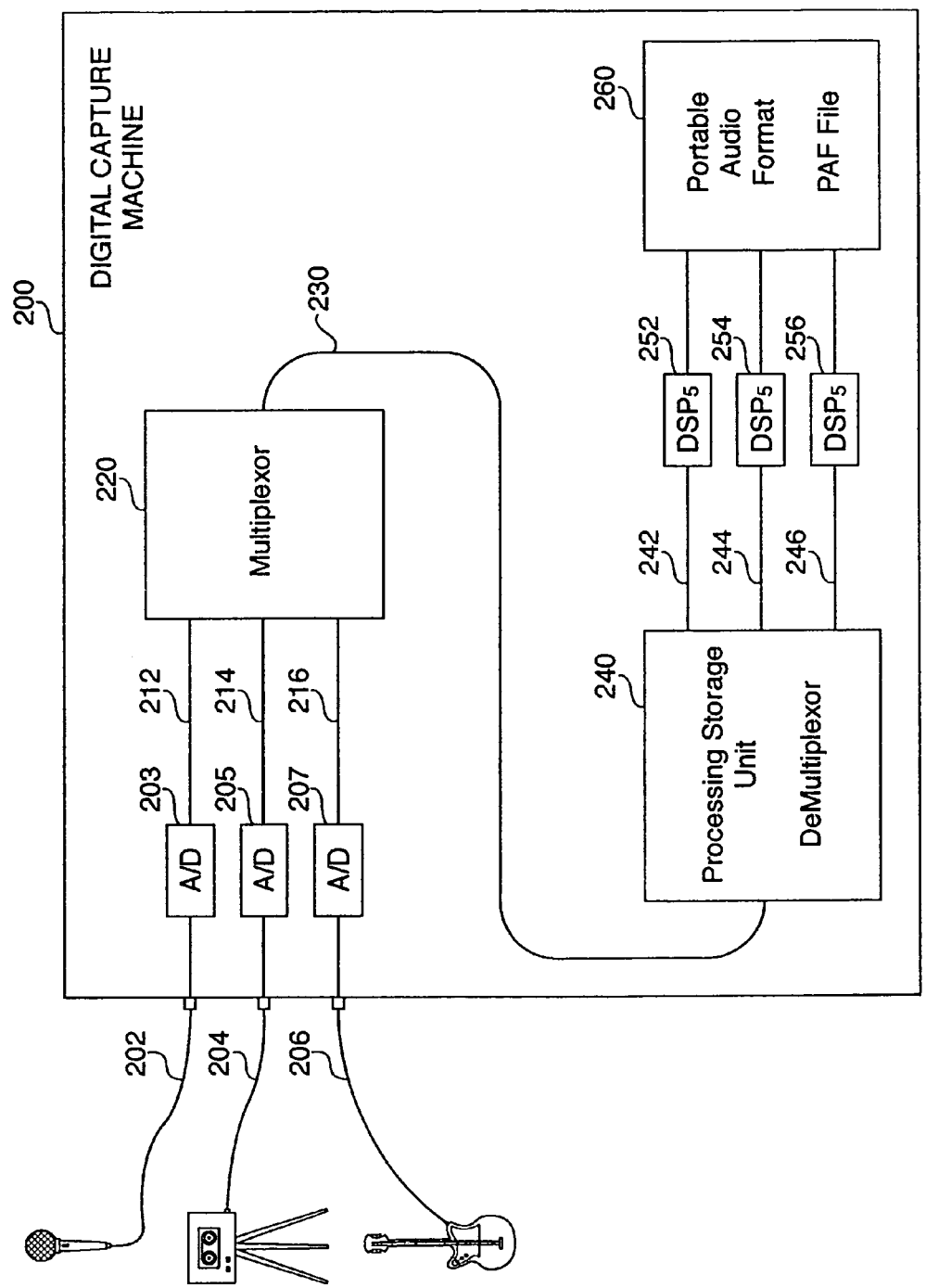
FIG. 2 shows a flow diagram illustrating the conversion of multi-channel analog signals into an encoded Portable Audio Format (PAF) file.

Now referring to FIG. 2 the conversion of multi-channel analog signals into an encoded Portable Audio Format (PAF) file will be discussed. During a live performance various analog signals 202, 204, 206 may come from various sources such as an artists microphone, a live video feed, instruments, and other devices relevant to a live performance. The various analog signals 202, 204, 206 are captured by a Digital Capture Machine 200. The Digital Capture Machine 200 receives the various analog inputs and then processes each input through an analog to digital (A/D) converter 203, 205, 207 at a sufficient level depending upon the analog signal 202, 204, 206 input type. The digital output streams 212, 214, 216 are sent to a Digital Multiplexor 220. The Digital Multiplexor 220 creates one signal containing the converted digital signals of all inputs which is then channeled though a single connector 230 to the Processing and Storage Unit 240. The Digital Multiplexor 220 allows the Digital Capture Machine 200 to separate the A/D converters 203, 205, 207 and the Digital Multiplexor 220 from the Processing and Storage Unit 240 and use a single connector 230.

The Processing and Storage Unit 240 then demultiplexes the signal back to separate channels 242, 244, 246 each containing a converted digital signal. Each channel is then sent to an individual set of Digital Signal Processors 252, 254, 256 which can be used to distribute data to various processing units in separate systems. By breaking up each of the channels into time-synchronized and locked data streams and distributing each channel to it's own dedicated processing and storage subsystem, the ultra high data rates and processing needs can be massively scaled. Once the capturing process is over, then a standard data sharing technology can combine all of the individually captured channels into a single, multi-gigabyte PAF file 260.

Further, each channel 242, 244, 246 will most likely contain additional data that will be kept in it's own mini-channel which will be included into the PAF file 260. The additional data will include information such as the type of instrument on a given sound channel, the location such as an attached microphone, and open hall, a small club that a particular channel is associated with. Further, the sound engineers real time adjustments to the sound mix for proper recording settings can be included as recorded data. Therefore, although the sound source is captured at a constant "line level" the live adjustments are marked, recorded, and digitally processed to give the desired effect. Once a sufficient number of samples have been recorded it will be possible to use the historical or saved data to create a "fuzzy logic" system that will be able to significantly reduce the amount of user interaction both during the recording and during pose production. The historical or saved data will have the benefit of the sound source, location and type of channel and the corrections previously made at each time unit to create a model of how future recordings should be handled.

It should be noted that most current high-end digital audio conversion systems utilize what is referred to as "CD-quality" audio. This type of digital conversion is done at a rate of 44,000 samples per second, each sample having a range of 65,000 profitable levels, half of which are above, and the other half of which are below, the audio zero baseline such that a sine wave representing a signal captured by such a system would have both a positive and a negative component. The 16-byte sample is split evenly between the upper and lower half.

This type of digital audio conversion is known as pulse code modulation and is limited to a maximum theoretical bandwidth of approximately 20 hertz to 2,000 hertz, which is widely accepted as the normal range of human hearing. Many people, and many audiophiles in particular, have the capability of distinguishing audio information well outside this range. The maximum theoretical capacity of the CD quality is actually up to 22 kilohertz but due to the inefficiencies of the digital audio conversion in both directions, this is practically impossible to reach.

Figure 3:
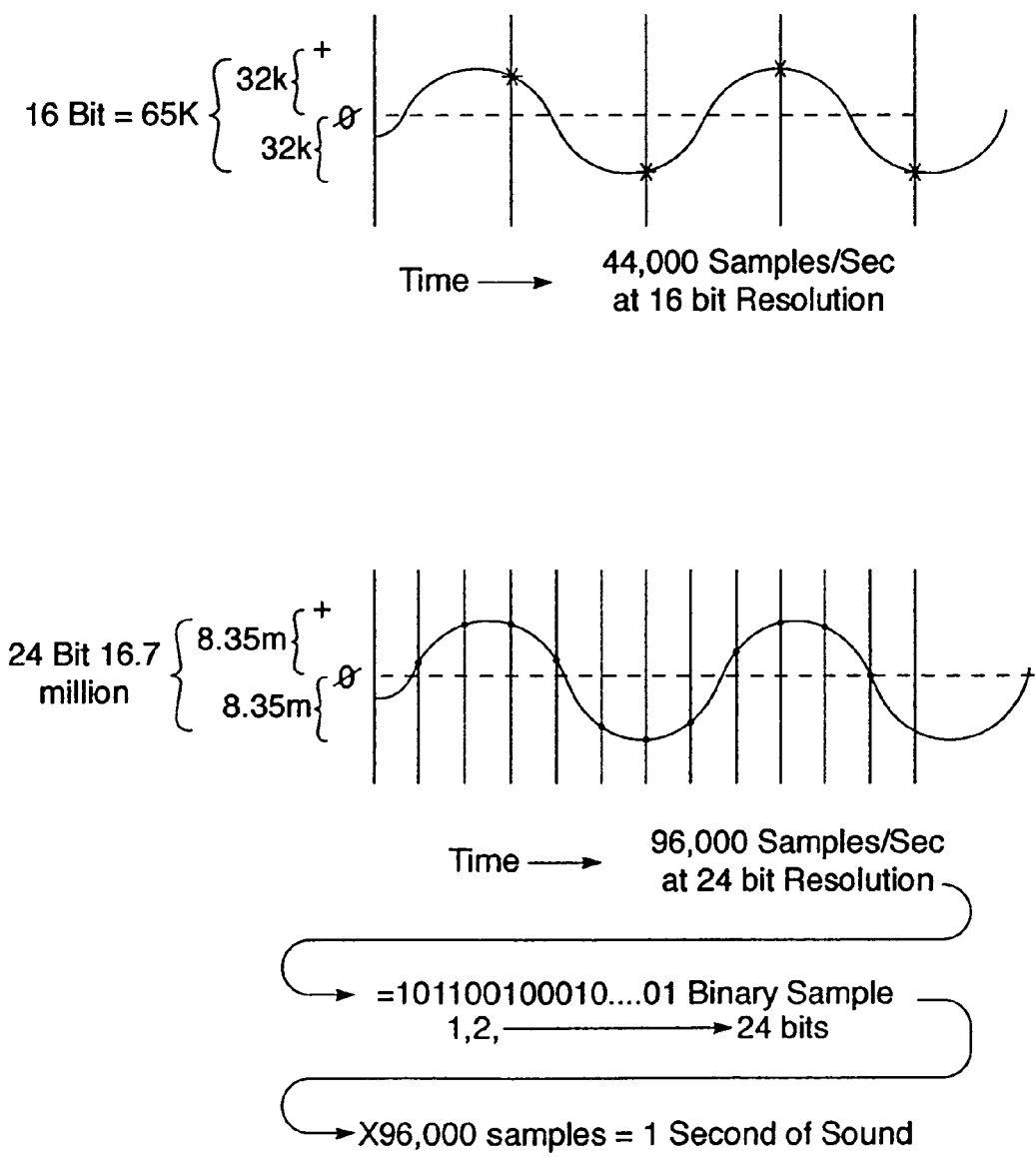
FIG. 3 shows a series of waveforms illustrating a simple Analog wave form sampling technique and a representation of the difference in precision that can be used to capture the signal in a digital format.

The distribution systems in accordance with a preferred embodiment of the invention uses a much higher-end recording system which samples the analog input at a rate of 96,000 samples per second, as illustrated in FIG. 3, which provides the capability of moving from theoretical upper limits of 22 hertz all the way up to 48 hertz, more than doubling the CD quality that is theoretically capable. And in addition, each of the 96,000 samples are preferably captured at a resolution of 24 bytes per sample for each sample and this gives a total range of precision of 16.7 million distinct levels as opposed to 64,000 levels, again evenly split above and below the median line for the zero value for a sound wave giving over eight million potentials for both the positive and negative values.

Figure 4:
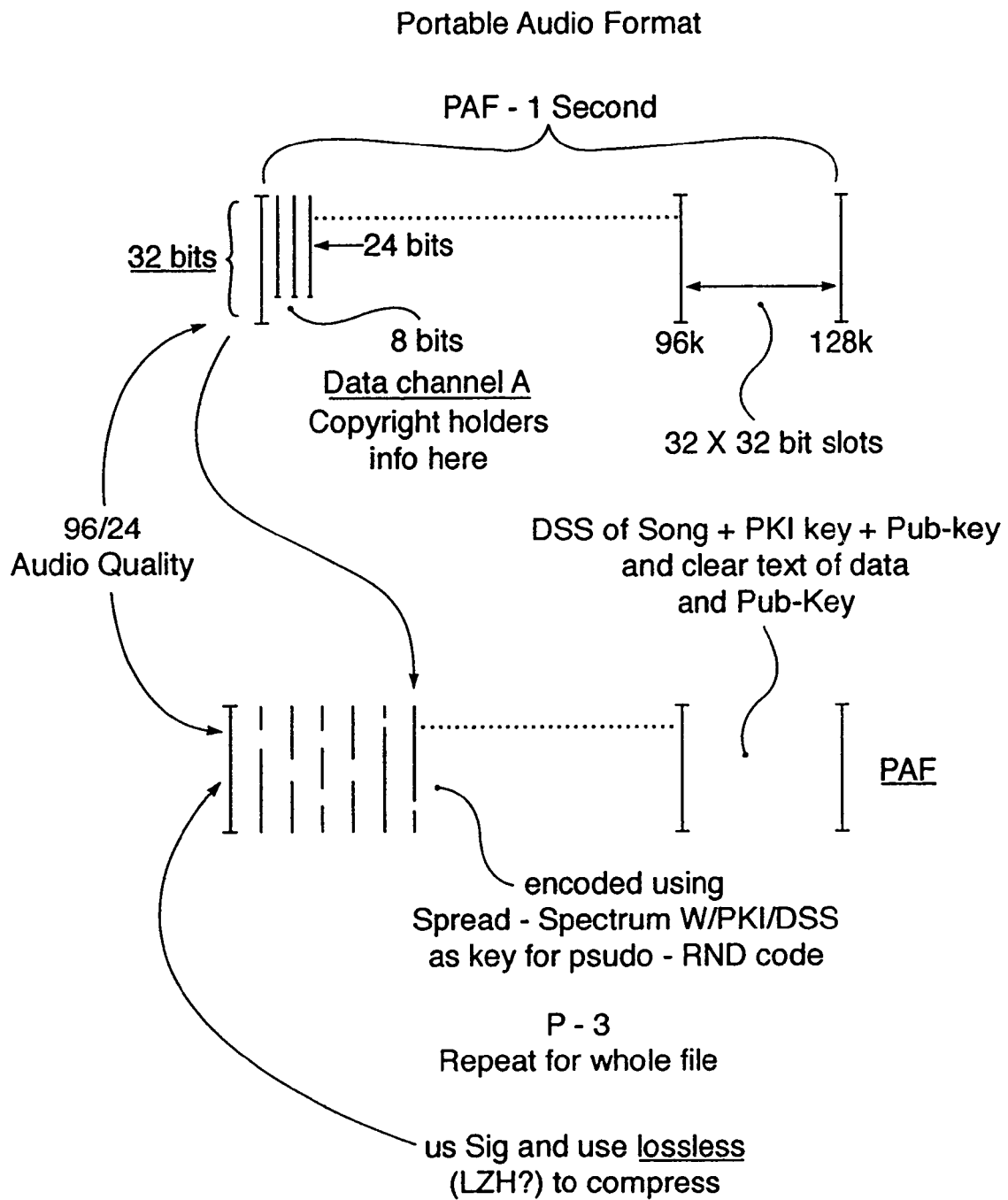
FIG. 4 shows a series of diagrams illustrating the conceptual bit orientation, and layout of the original file, and the locations of the non-audio data, and signature encoding. This is both before and after a spread-spectrum encoding is applied to the data to "mix" the information such a way as to make extraction of the watermark difficult.

The present invention also includes novel processes and recording additions which may be run on a Unix platform or a Windows NT platform or encoded into a hardware-specific device that may then be utilized for any type of recording media. As depicted in FIG. 4, an environment is preferably used wherein recording is done at levels of 120 to 128 samples per second, with the precision of 32 bytes per sample. Because of the additional information that is not captured by using that high data rate, each sample has an additional eight bytes of information, as seen in FIG. 4. Therefore, at the end of every eight seconds, there is an additional block of 24 32-byte slices of time which can be utilized to encode both the copyright-holder's information as well as provide a digital signature and watermark for it.

A digital watermark can be created and encoded into each of those unique time slices, preferably across the entire run time of the recording. The watermark may include the name of the performer, an identification of the particular tour (e.g., "1999 World Tour"), the venue and date of the performance, and a time and date stamp created directly from the system itself. Each watermark preferably includes a digital signature generated using a secure hashing algorithm, and then the signature is put in place using public key cryptography using, e.g., the public domain digital signature standard to create this. This can be used to ensure that the audio block could not be re-arranged in digital format without the digital signature failing.

The process may then be re-run on the entire file so that while the system itself is recording the information that it is continually placing into it the digital watermark the entire file itself is also digitally authenticated. The PAF file will actually contain two levels of verification; the first being the repeating code sequence that is a part of the file structure itself along each block and "digitally signing" each block as it is created, while the second level is to perform the same function on the entire file as a whole to generate a whole file signature in addition. Thus any piece of the file will have verification, as well as the whole file itself.

Conventional audio watermarking methods, including those utilizing psychoacoustic principles, typically degrade sound quality. With respect to conventional analog watermarking techniques, it is not possible to modify the actual analog sound stream without some level of degradation of the sound quality. Further, conventional audio watermarking techniques typically do not survive a conversion of the file from one format to another, e.g., from .wav format to .mp3 format. The above-described digital watermarking method of the invention according to its preferred embodiment provides significant advantages over conventional audio watermarking methods in that it does not and cannot affect the sound quality at all, and also is applicable to any digital audio file format and survives file format conversion.

Figure 5:
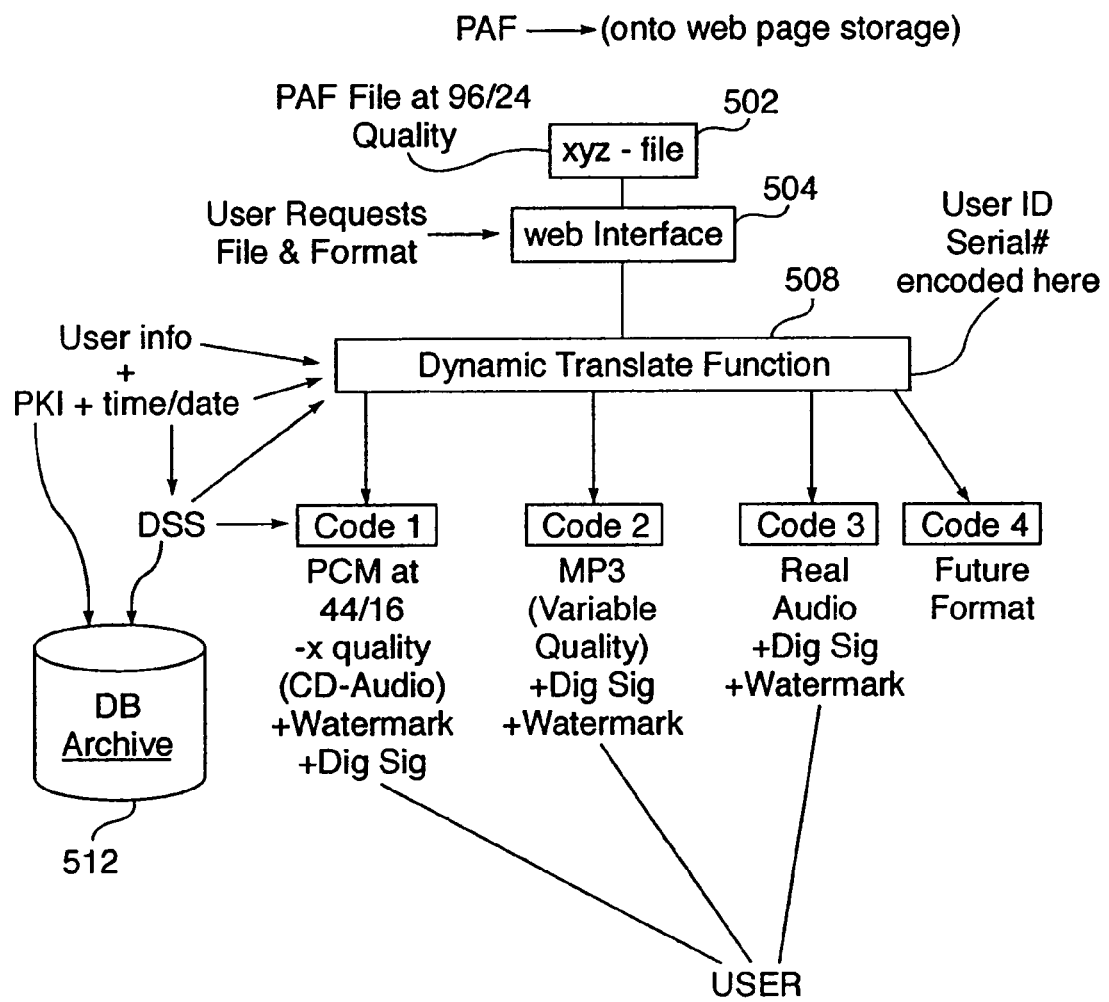
FIG. 5 shows a flow diagram illustrating the flow logic of how the primary data file (the PAF) is re-encoded on a Per-User-Transaction basis, and encoded with a unique serial number at that time as it is converted to any of the current or yet to be developed industry standards. This also shows how a "best of breed" encoding engine is utilized for each of the current (and future) standards to assure the highest level of audio quality and digital watermarking is retained.

As illustrated in FIG. 5, as the live performance continues, each time a song or act is completed, the audio engineer preferably closes the portable audio format file 502 and then, using a high speed internet connection or high-speed direct connection (e.g., a local land line or a satellite connection) the file is transmitted immediately to the live music service provider 504 in its compressed state. This will utilize less compression, again to avoid the loss of any type of audio information. All of the digital watermarking is preferably incorporated into the data stream outside of the audio channel and so may it be directly read without any interference with the theoretical audio capabilities of an analog signal.

As soon as the file is received by the live music service provider and a signature verification is performed, the file is placed both in a long term archive 512 as well as in the holding area 508 for user download. This long term archival system will involve a secondary process. These files are then coded into the HTML (or XLM) open shell, and placed for user download while the concert performance is occurring, thus ensuring the fastest possible transition from the live performance to user availability. A concert may consist of 10 to 15 individual songs, along with commentary and/or other occurrences in between the songs and performance, and these may be provided for download as full concerts, individual songs, or combinations thereof.

A user using a standard web browser may select the type of media format in which they would like to receive their information. Examples include MP3 for download, real audio for download, and CD (via a physical distribution process). Although the process of the invention can be used to distribute/sell audio files in the .wav format, placing a digital watermark into such files may involve degradation of the audio quality since by nature the pulse code modulation utilizes every piece of information in the file itself as audio channel information. Thus any inserted information, regardless of the technique, will at some level degrade the file. And, .wav files normally have a very large file size. This is also true of some portable audio format files. This can be slightly avoided on the physical process of burning a CD by tagging the end of the file. On the other hand, if a CD is burned using this process for the first time, physical media can tO be custom-created with the same protection that exists for any CD media, and can be easily shipped to a customer. This CD has a unique serial number that prevents it from being recognized by standard Internet databases such as www.cddb.com. Other protection mechanisms can be utilized on the "custom burn" such as the addition of "hidden tracks" or sound blocks to uniquely identify the CD.

In the preferred embodiment, each individual transaction, whether a consumer elects to receive a shipped CD or a downloaded digital audio file, is assigned a unique serial number and that serial number is encoded within the file or on the CD, and is stored in a back-end database. When a consumer purchases one of these files for download, his name, shipping information, credit card information, and possibly other pieces of demographic information, are entered. This information along with other information such as a precise time and date stamp and a portion of a secret key can be used by the live music service provider to produce a secured digital signature through an algorithm such as SHA-1, and that digital signature can be added to the purchased file on a dynamic, real time basis prior to delivery/download to the customer. This information can also be stored in a database both for demographic as well as copyright holder protection so that if the user was to, for example, rip the song in its entirety from the CD and then place it on a website for download by the general public, the service provider would be able to identify that specific song and that specific user from the specific transaction serial number that has been encoded into the file.

The audio file format selected by the user preferably determines the type of downgrading encoder that is used. For digital audio file formats such as MP3 and real audio, the system of the invention preferably uses a digital watermark that the audio decoder will throw away as extraneous noise when the file is "played." In this case, as set forth above, each transaction is uniquely marked with its own serial number at the individual song level to allow for later informational use by the live music service provider as well as for identification of the individual user. For a file format such as MP3, digital information can be encoded into the file using generally the same method to produce a digital watermark.

Recording Considerations

Described below are various considerations that must be considered regarding the hardware, software and other issues related to recording digital audio.

The digital capture machines may be constructed using commercial off the shelf technology that is borrowed from the high-speed data fields of the computer industry. The basic hardware setup consists of one or more AD converters capable of sampling data at 96 KHz at 24 bits resolution. The AD converters are external since the interior of a computer is a bad place to be doing analog recording and conversion. The converters communicate with a PCI card on the computer end. At this time we use both RME Pad96 and DIO Delta 2496 cards. The converters transmit data via a TOSLink fiberoptic cable. That is essentially the complete hardware setup.

In a preferred embodiment the digital capture machines will incorporate the functions of a 32 track or more digital sound board, and recording equipment, in a small package. In order to overcome today's limitations on data recoding and through put speeds, the system will utilize a two-phase approach. The first phase will utilize a series of control cards. The control cards simply link through an optical or other high quality copper interconnects to the modular patch panel where the xlr or other inputs would come in. This high density feed would then come in through a proprietary mix format into a distribution control card, which then feed through an internal multichannel high-speed parallel bus. The parallel bus will be independent of the host operating system bus. It would transfer the data channels, from 4 to 8 at a time, to the sound processing cards. The sound processing cards, each having 8 discrete digital sound processors and encoding processors, would also include and ide or scsi hard drive channel which would then allow it to connect to a high capacity A.V. certified hard drive. This will allow for the rapid collection a Synchronization issues must also be considered when using multiple AD converters since zip they must be synced together to produce the right sound. This feature is usually built into the hardware and is transparent to the software.

Another consideration regards the incoming data because the data has a fairly high volume transfer. The volume transfer has a rate of 96000*3*2 bytes per second which is sent to the computer for a stereo signal. No massaging of the signal is performed while recording. The raw data is simply stored into the format described in a later section.

There are also numerous issues and considerations regarding the recording software. In a preferred embodiment the software itself is written on the Windows platform and contains interface and driver code that is specific to that platform.

The interface is designed to avoid human error as much as possible. It is virtually impossible to modify anything that has to do with the recording in this tool. The user is able to record, mark the beginning of songs and end the recording. The user is also able to add custom information that gets stored along with the audio data. Any handling of the data is done using separate tools that can be operated in a more controlled environment. The interface consists of standard Windows UI controls.

The interface to the driver goes through the standard Windows wave functions. The software records a stream of data using two one second buffers. While one is being filled the other is being saved. The software simply keeps alternating between the two buffers.

Further, since it is impossible to write out the data in the actual callback routine it becomes necessary to send a message to the main window asking it to save the data. Should the system decide to take over the computer for more than a second a block of data will be lost. It is necessary to construct a secondary queue of data for later transfer to a permanent medium.

Since many of the PAF fields are variable lengths it becomes necessary to re-parse the file and insert size indicators when recording is done. It is also virtually impossible to insert additional data in the beginning of the file once recording has begun due to the size of the attached data.

Storage Format Considerations

The problem with storage is that the standard Windows format, WAV, does not support files larger than 2^31 or around two gigabytes. It also does not support channels beyond stereo. To solve these and other problems the files are stored in a PAF format which is described in more detail below.

The are several considerations that need to be made. One is that most data is variable length. The file format should accommodate variable size fields and also missing data fields. It should also be possible to upgrade the format without destroying previous versions. The format needs to handle many varieties of data layouts for the audio stream itself. It should also be able to handle multiple channels.

Implementation of this format requires use of a variety of the EA IFF 86 formats. To overcome the traditional 2 gig limit on audio streams a 64 bit size field will be used. New CHUNK identifiers can be created and registered with technical management. Microsoft C++ supports the _int64 data type specifier. This will used for all PAF fields. A chunk will look as follows:

| | |
|---|---|
| CHUNK ID | 4 bytes |
| CHUNK length | 8 bytes |
| CHUNK data | variable |

There will be only one required chunk whith the initial FORM CHUNK ID. This is necessary to identify the file as a PAF and also to provide a framework within which to read the remaining chunks.

Since the PAF format is proprietary there is no tool that will play them back unless one is created. The resolution is also too high to be burnt onto a CD. For this purpose an extraction tool was created as part of the present invention.

Conversion Issues

There are two issues when converting samples. One is the sample rate and the other is the bit resolution. The bit resolution is simple since it is a straightforward division. Rounding can be added for additional precision. The sample rate becomes much more complicated. When downsampling from 96 KHz to 44.1 KHz it is customary to simply take every 96/44.1 sample and write these to a new file. This, however, introduces a good amount of noise. This noise comes from the frequencies lying above the Nyquist theorem frequency limit. The Nyquist theorem stipulates that the maximum frequency is sample rate over two. This means that for a 44.1 KHz sample the maximum frequency is 22.05 KHz. For a 96 KHz sample it is 48 KHz. The frequencies above 22.05 will create noise when downsampling. Therefore it is necessary to remove these frequencies before converting the sample rate. Typically, a FIR or Finite Impulse Response filter is used.

The finite impulse response filter is used to remove unwanted frequencies. In this implementation the filter coefficients were created with the standard Remez program. The converter runs a separate filter for each channel. The samples are converted to floats, passed through the filter, converted back to integers and then extrapolated into the resulting sample rate.

The final implementation is a standard Windows drag-and-drop dialog box. It separates the sample pieces at the marks, adding ten seconds on either side, filter the samples and outputs individual WAV format files suitable for playback or burning onto CD. The tool also supports output at 2496.

Data Encoding in Data Bit Streams

The data will have different limitations based on the length of the audio clip itself. Assuming, for descriptive purposes, that all samples will be at least song-length, that is to say more than 2 minutes of data, which, for CD audio, is equivalent to 21,168,000 bytes which is enough data to encode your average novel. The data can be anything that can be represented digitally. It is here assumed that the information would be a digital signature and/or verbatim customer information. Incidentally, it would be possible to actually insert the lyrics for a given song using some of the methods described below.

The inserted data will cause some wave distortion. The amount will vary based on the sampling rate of the particular audio file. In reality, if done properly, it should inaudible to the human. With invisible insertion (see below) the volume variance will be none or $\frac{1}{65536}^{th}$ of the full volume range. Also since the inserted data stream is generally minimal and almost negligent in regards to the amount of wave data it should remain completely undetectable by the human ear. Only highly sophisticated electronic devices would be able to detect the difference and maybe not even then.

Information can also be attached in header format. This data is very easy to detect and does not necessarily conform to any official format depending on the type and amount data that needs to be attached. This solution by itself would not be acceptable for a release format.

There are several formats currently in use in audio field. The most common is the wave (.WAV) format which is easily recognized by most PC-based software. Mpeg layer-3 (.MP3) is also receiving more recognition due to its effective compression rate. Another widely used format is the Sound Designer II (.sdII) format which is mainly used on the Macintosh line of computers in professional audio. Both waves and Sound Designer formats are easily read by Sound Designer and Pro Tools which are the most commonly used professional tools. For the average user wave and mp3 formats would be sufficient.

It should be noted that any time the user converts an audio file to any other sample rate or to a lossy compression format any encoded information will be lost.

Insertion Techniques

There are three insertion techniques which are the brute force, the subtle, and the invisible insertion techniques. The three insertion techniques will be described in more detail below.

The brute force insertion simply inserts the data verbatim into the audio data. For a 160 byte signature in a CD quality audio stream this equates to an 18 millisecond click or $\frac{1}{50}^{th}$ of second approximately. This is not likely to be noticeable. Optionally the signature could be inserted at the beginning or end where there is frequently some noise in the form of click from simply starting or stopping playback. This signature would relatively simple to detect and remove by any unauthorized customers.

Subtle insertion is the same as the brute force method except the data will be scattered throughout the wave data using a variety of displacement methods. Ideally data should be kept away from any zero crossing data areas and also away from regular or repeating wave patterns. These could be detected algorithmically. An additional byte or word could be attached to each data byte encoding the displacement of the next data element.

The invisible insertion is not exactly invisible, but it is hard to detect visually and virtually impossible to hear. This method involves encoding the message, bit by bit, in the low bit of the wave data. The volume variance has been described above. This method represents the ideal way of storing data. It is for all practical purposes undetectable in every way that counts. By treating the data to be encoded as a bit stream and then, starting at a predictable position in the wave, inserting those bits into bit zero of a sequence of wave data entries the entire message can be encoded. Note that in approximately half the cases the bits are already set correctly thus causing no modification to the sound data. Any bit could be used in the sample data but bit zero has the least effect on the sample quality. At the time of writing this section this document had 5727 characters in it. That would need approximately half a second of sample time to encode.

Non-specific signatures or Non-specific data refers to identifiable data that does not contain any specific information and has no purpose other than to be identifiable. This kind of data serves to be a marker or reference that allows the encoder to uniquely identify the wave as their property in a way that is unambiguous.

Given a predictable step throughout the wave data it would be possible to find a sequence within reasonable tolerance of a Fibonacci sequence. That part of the wave would then be conformed to a Fibonacci sequence. The sequence need not be long but it must be at a predictable offset in the file. This procedure would need to be repeated several times in a given wave file to reduce the probability of a natural occurrence. Alternately, several sequences of exponential or linear growth arrays could be used to get the best possible fit. If the sequences are sufficiently short this will not induce any appreciable noise into the wave data.

A sample relies on changing data values to produce. A sequence of maximum values will produce only silence, it is the changing of the numbers that produce the audio. By inserting numbers which change only very little, data can be inserted that is virtually silent.

When discussing the encoding of data into an audio bit stream the following considerations need to be considered:

Audio Quality

Audio quality is obviously very important. The schemes discussed above have little to no effect on the sample quality.

Visibility of Data

Visibility of the data is important for protection issues. It is imperative that it be made as hard as possible for any potential software pirate to detect any signatures embedded in the data.

Size of Data

This is of lesser importance since if invisible insertion is used. But for the other methods it is obvious that the more data that is inserted the more clicks appear in the wave data.

Extraction of Data

The extraction method would be a program that was never released to the public. Software pirates rely heavily on the presence of an extractor to break protections. Since the wave data will play fine with the data encoded in them there is no need to provide an extractor to the public, thus making it virtually impossible for a pirate to remove the data. They also have no need to remove it since it plays fine as it is.

Insertion of Data

This is only a processing time issue. This should be reasonably fast. A prototype will be constructed and performance issues addressed.

Data encoding in MPEG Layer 3 Audio File

This section is a general overview of Moving Pictures Expert Group Layer 3 encoded files. It briefly outlines the format and then proceeds to talk about the problems inherent in encoding data in such a stream.

The MPEG Layer 3 format or MP3 is essentially a bit stream format where nothing is aligned in a computer readable form. The only exception to this is the SYNC-WORD that precedes each audio frame. Each audio frame is a set of DCT coefficients. DCT is Discrete Cosine Transform which is very reminiscent of the traditional Fast Fourier Transform. Attached to each audio frame is a certain amount of side info, the amount of which is based on the encoder and type of encoding used.

The problem with encoding data into this format is that there is no audio in the MP3 file. The audio is constructed using a reverse DCT and played back as regular PCM data. The data cannot be modified without breaking the format or degrading the audio quality. There are, however, a number of bits throughout the data that could be used safely. A discussion of this follows.

The following options are available to insert information into an MP3 file:

NULL audio frame insertion.

Ancillary Data bits.

Private bits in audio frames.

Private bits in headers.

The first option is used by Xing Tech to insert seek information into an MP3 file. This is both obvious and will degrade the audio data, albeit in an extremely minor way.

The second option is very complicated and very detectable by anyone with decoder source code which is freely available.

The third option is not bad but the private bits are clustered in groups of five and require some analysis of the audio frames to insert properly.

The fourth option was chosen because it will scatter the encoded message throughout the file in single bit increments. The private bit here is always ignored by player software.

The implementation is very simple. The audio frame size, or, rather, the step rate to the next syncword is fixed and can be precalculated using the following formula:

$$144*bit\_rate/sampling\_frequency$$

Note that this is only valid for MP3 and not for layer 1 and 2 encoding. In some cases the audio frame size is modified to keep the bit stream rate constant. This is indicated by the padding_bit in the header. The tool calculates the frame size and step through the file adding the pad if necessary and inserts the message throughout the private bits in the headers.

Insertion and Extraction

As described above the file is streamed using seeks to the headers throughout the file. The message is broken into its component bits and inserted into the private_bit field of each one until the end of the message. The extraction is the exact opposite of this procedure.

Although the present invention is described in connection with the capturing of a live to performance such as a concert the system could be used with any system with analog signals such as a monitoring system of a power plant or a security system with multiple camera feeds. The intent of the invention would remain the same and would allow the analog signals to be converted to a digital format into a portable file. Subsequently the portable file can be retrieved and replayed with all channels being synchronized with little or no distortion.

While the preferred embodiment and various alternative embodiments of the invention have been disclosed and described in detail herein, it will be apparent to those skilled in the art that various changes in form and detail may be made therein without departing from the spirit and scope thereof.

I claim:

1. A method for capturing and distributing live content over a network comprising the steps of:
    capturing signals of a live performance;
    converting said signals to a digital format using a first sampling rate and a first resolution;
    encoding said digitally formatted signals into a portable file at a second sampling rate and a second resolution wherein said second resolution is greater than said first resolution, a first data block is inserted into said added resolution, said second sampling rate is greater than said first sampling rate, a second data block is inserted into said added samples, and a first digital watermark comprises said first data block and said second data block; and
    each time a song or act is completed, closing said portable file and transporting said portable file over a network.

2. The method of claim 1, further comprising the steps of:
    receiving said portable file;
    publishing said portable file for use by an end user;
    converting said portable file to a format selected by said end user; and
    transporting said converted file to said end user.

3. The method of claim 2, further comprising the step of:
    inserting a second digital watermark into said converted file prior to transporting said file to said end user.

4. The method of claim 3, wherein said second digital watermark is inserted by a brute force insertion method, a subtle insertion method or an invisible insertion method.

5. The method of claim 3, wherein said second watermark comprises a digital signature for said portable file as a whole that identifies said end user.

6. The method of claim 3, wherein said second digital watermark does not degrade playback of said portable file.

7. The method of claim 2, wherein said portable file is published on a CD.

8. The method of claim 2, wherein said format selected by said end user is a WAV format, a MP3 format, a sdII format or a Real Audio format.

9. The method of claim 2, wherein the step of transporting said converted file to said end user comprises the step of burning said converted file onto a CD, or downloading said converted file to a computer, memory or MP3 player.

10. The method of claim 1, wherein the step of encoding said digitally formatted signals into a portable file comprises the steps of:
converting said digitally formatted signals into a combined signal;
storing said combined signal;
converting said stored combined signal into a plurality of digital signals; and
converting said plurality of digital signals into said portable file at said second sampling rate and said second resolution.

11. The method of claim 10, wherein said plurality of digital signals are time-synchronized and locked.

12. The method of claim 10, wherein said plurality of digital signals can be extracted from said portable file for future editing or mixing or mastering.

13. The method of claim 1, wherein said first watermark identifies said live performance.

14. The method of claim 1, wherein:
said first sampling rate is greater than 44,100 samples per second and said first resolution is greater than 16 bits per sample; and
said second sampling rate is at least 96,000 samples per second and said second resolution is at least 24 bits per sample.

15. The method of claim 14, wherein:
said first sampling rate is approximately 96,000 samples per second and said first resolution is 24 bits per sample; and
said second sampling rate is between 120,000 and 128,000 samples per second and said second resolution is 32 bits per sample.

16. The method as recited in claim 14, wherein:
said first sampling rate is approximately 128,000 samples per second and said first resolution is 32 bits per sample; and
said second sampling rate is approximately 160,000 samples per second and said second resolution is 40 bits per sample.

17. The method as recited in claim 1, wherein:
said added resolution comprises approximately 8 bits per sample; and
said added samples comprises approximately 32,000 samples per second.

18. The method as recited in claim 1, wherein:
said first data block comprises a repeating code sequence; and
said second data block comprises a digital signature.

19. An analog signal capture and converting device comprising:
a capture device which receives a plurality of analog signals and converts said analog signals to a plurality of digital signals at a first sampling rate and a first resolution;
a multiplexor connected to said capture device for converting said plurality of digital signals into a combined signal;
a processing unit connected to said multiplexor via a single connector for converting said combined signals to a plurality of time-synchronized and locked digital signals; and
a plurality of digital signal processors connected to said processing unit for each of said plurality of time-synchronized and locked digital signals for directing said signals, wherein at least one of said signals from said plurality of digital signal processors is converted into a portable file at a second sampling rate and a second resolution wherein said second resolution is greater than said first resolution, a first data block is inserted into said added resolution, said second sampling rate is greater than said first sampling rate, a second data block is inserted into said added samples, and a first digital watermark comprises said first data block and said second data block.

20. The device of claim 19, wherein said multiplexor and said processing unit are in different physical locations.

21. The device of claim 19, wherein said first digital watermark comprises two or more levels of verification.

22. The device of claim 21, wherein said two or more levels of verification comprise:
a repeating code sequence encoded in said first data block; and
a digital signature encoded in said second data block.

23. The device of claim 21, wherein said first digital watermark does not degrade playback of said portable file.

24. A system for capturing and distributing live content over a network comprising:
a capture system for capturing live content, for converting a plurality of analog signals into a plurality of digital signals using a first sampling rate and a first resolution, for converting said plurality of digital signals into a combined signal, and for transporting said combined signal to a processing and storage system via a single connector;
wherein said processing and storage system stores said combined signal, converts said combined signal back to said plurality of digital signals, converts said plurality of digital signals into a portable file, and closes said portable file each time a song or act is completed;
wherein said plurality of digital signals are converted into said portable file at a second sampling rate and a second resolution wherein said second resolution is greater than said first resolution, a first data block is inserted into said added resolution, said second sampling rate is greater than said first sampling rate, a second data block is inserted into said added samples, and a first digital watermark comprises said first data block and said second data block; and
wherein said portable file is transported over a network to a server.

25. The system of claim 24, wherein said portable file is published for use by a plurality of end users.

26. The system of claim 25, wherein said portable file is published on a CD.

27. The system of claim 24, wherein a second digital watermark is inserted into said portable file prior to transport to said end user.

28. The system of claim 27, wherein said second digital watermark is inserted by a brute force insertion method, a subtle insertion method or an invisible insertion method.

29. The system of claim 27, wherein said second digital watermark does not degrade playback of said portable file.

30. The system of claim 24, wherein said each of said plurality of end users receives said portable file with a unique second digital watermark.

31. The system of claim 24, wherein said portable file is converted to a WAV format, a MP3 format, a sdII format or a Real Audio format.

32. The system of claim 24, wherein said first digital watermark comprises two or more levels of verification.

33. The system of claim 32, wherein said two or more levels of verification comprise:
   a repeating code sequence encoded in said first data block; and
   a digital signature encoded in said second data block.

34. A method for capturing and distributing live content over a network comprising the steps of:
   capturing signals of a live performance;
   converting said signals to a digital format using a sampling rate greater than 44,100 samples per second and a resolution greater than 16 bits per sample;
   encoding said digitally formatted signals into a portable file at approximately 32,000 samples per second higher than said sampling rate and approximately 8 bits per sample higher than said resolution, a first data block is inserted into said added resolution, a second data block is inserted into said added samples, and a first digital watermark comprises said first data block and said second data block;
   each time a song or act is completed, closing said portable file and transporting said portable file over a network;
   publishing said portable file for use by an end user;
   converting said portable file to a format selected by said end user;
   inserting a second digital watermark that identifies said end user into said converted file; and
   transporting said converted file to said end user.

* * * * *

UNITED STATES PATENT AND TRADEMARK OFFICE
CERTIFICATE OF CORRECTION

| | |
|---|---|
| PATENT NO. | : 7,363,497 B1 |
| APPLICATION NO. | : 09/620572 |
| DATED | : April 22, 2008 |
| INVENTOR(S) | : Ferguson et al. |

It is certified that error appears in the above-identified patent and that said Letters Patent is hereby corrected as shown below:

Title Page, Item (54), the title "SYSTEM FOR DISTRIBUTION OF RECORED CONTENT" should be changed to --SYTEMS FOR DIGITAL WATERMARKING AND DISTRIBUTION OF RECORDED CONTENT--.

Column 1, lines 1-2, the title "SYSTEM FOR DISTRIBUTION OF RECORED CONTENT" should be changed to --SYTEMS FOR DIGITAL WATERMARKING AND DISTRIBUTION OF RECORDED CONTENT--.

Signed and Sealed this

Eighth Day of July, 2008

JON W. DUDAS
*Director of the United States Patent and Trademark Office*